(12) United States Patent
Doherty et al.

(10) Patent No.: US 7,664,096 B2
(45) Date of Patent: Feb. 16, 2010

(54) REMOTE LOCATION VOIP ROAMING BEHIND FIREWALLS

(75) Inventors: James M. Doherty, Georgetown, TX (US); Thomas Lee Adams, Austin, TX (US); Steve Mueller, Austin, TX (US)

(73) Assignee: AT&T Intellectual Property I, LP, Reno, NV (US)

( * ) Notice: Subject to any disclaimer, the term of this patent is extended or adjusted under 35 U.S.C. 154(b) by 1306 days.

(21) Appl. No.: 10/604,072

(22) Filed: Jun. 25, 2003

(65) Prior Publication Data

US 2004/0264439 A1    Dec. 30, 2004

(51) Int. Cl.
*H04L 12/66* (2006.01)
*H04L 12/56* (2006.01)

(52) U.S. Cl. .................................. 370/352; 370/401
(58) Field of Classification Search .............. 370/352, 370/401
See application file for complete search history.

(56) References Cited

U.S. PATENT DOCUMENTS

| | | | |
|---|---|---|---|
| 5,950,195 A | 9/1999 | Stockwell et al. ............... 707/4 |
| 5,968,126 A | 10/1999 | Ekstrom et al. ............. 709/225 |
| 6,061,346 A | 5/2000 | Nordman ..................... 370/352 |
| 6,101,543 A | 8/2000 | Alden et al. ................. 709/229 |
| 6,144,671 A | 11/2000 | Perinpanathan et al. ..... 370/409 |
| 6,154,465 A | 11/2000 | Pickett ........................ 370/466 |
| 6,154,839 A | 11/2000 | Arrow et al. ................. 713/154 |
| 6,161,008 A | 12/2000 | Lee et al. ..................... 455/414 |
| 6,233,234 B1 | 5/2001 | Curry et al. .................. 370/356 |
| 6,233,616 B1 | 5/2001 | Reid ............................ 709/225 |
| 6,321,267 B1 | 11/2001 | Donaldson ................... 709/229 |
| 6,345,294 B1 | 2/2002 | O'Toole et al. .............. 709/222 |
| 6,359,880 B1 | 3/2002 | Curry et al. .................. 370/352 |
| 6,958,992 B2 * | 10/2005 | Lee et al. ..................... 370/352 |
| 7,009,984 B2 * | 3/2006 | Watson ........................ 370/401 |
| 2002/0075844 A1 | 6/2002 | Hagen ......................... 370/351 |

FOREIGN PATENT DOCUMENTS

| | | |
|---|---|---|
| WO | 02/03217 | 1/2002 |
| WO | 03/028340 | 4/2003 |
| WO | 03/105410 | 12/2003 |

OTHER PUBLICATIONS

J. Rosenberg, et al., "Getting SIP through Firewalls and NATs," online, Feb. 22, 2000, 26 pgs.

* cited by examiner

*Primary Examiner*—Rasha S Al Aubaidi
(74) *Attorney, Agent, or Firm*—Hanley, Flight & Zimmerman, LLC

(57) ABSTRACT

A connection between an external host and a host internal to a network (e.g., VPN or LAN) and located behind a firewall and/or NAT-enabled device is established and maintained. A dynamic DNS server is updated with the remote location (RL) information associated with the internal host. This information includes the dialed number (i.e. the number assigned to the internal host), the physical address of the internal host, the private IP address corresponding to the internal host, the public IP address corresponding to the firewall, and the port on which voice data is to be communicated. Each time the internal host's location changes, a new and updated record is sent to the dynamic DNS server. The call placed by an external host reaches its final destination based on the record information in the DNS server table. Once the connection between the external host and the internal host is established, voice traffic is "cut-through" the firewall on this channel associate with the port designated by the RL record.

17 Claims, 3 Drawing Sheets

REMOTE LOCATION VOIP ROAMING BEHIND FIREWALLS

BACKGROUND OF INVENTION

1. Field of the Invention

The present invention relates generally to the field of IP telephony. More specifically, the present invention is related to IP telephony behind firewalls.

2. Discussion of Prior Art

Deployment of IP telephony has been slow and thus far, not particularly widespread because of compatibility issues with firewalls and network address translators (NAT). Provisions for roaming IP telephony devices within a network or networks have been limited, as most organizations, from large corporations to small businesses, employ the use of these network devices. Thus, users residing in these networks are often precluded from fully utilizing and benefiting from IP telephony. Networks protected by firewalls that allow persistent, un-monitored channels become highly vulnerable since an unmonitored channel makes the network susceptible to inbound, unfiltered, malicious traffic. Additional complications arise due to the fact that IP telephony solutions for networks having NAT require the discovery of NAT translations. This achieves less than optimal performance, since an additional piece of software must discover compression and de-compression techniques as well as NAT translations to allow for the discovery of prematurely closed telephony connections through the firewall. Thus, additional software, processing, memory, and disk storage space are required.

The following patents provide a general teaching of IP telephony.

U.S. Pat. No. 6,161,008 discloses a method for establishing communications with a user that employs multiple heterogeneous networks. A personal mobility application receives a request from a calling user containing the personal identifier of a called user. The personal identifier is used to retrieve a user record containing a plurality of terminal records, with each of the terminal records having a respective terminal address. Analyzing network usage profiles or user profiles determines the terminal address to which the calling user connects. This method does not guarantee that a terminal device will receive the call placed by the calling user. Rather, the method provides for a way to select the most likely choice of terminal address to which the user is connected.

U.S. Pat. No. 6,144,671 discloses a personal mobility method for allowing a called user having a personal host connected to a packet-based communications network at a home address to receive, at a foreign host connected to the network having an in-care-of address, a multimedia call from a calling user originally directed towards the personal host of the called user. Also disclosed is an application-layer solution for distributing multimedia calls among a plurality of peer computing devices, each of which has an address.

U.S. Pat. No. 6,359,880 discloses a localized wireless gateway offering cordless telephone service, including voice communication service, via a public packet network. The system includes a plurality of base station transceivers that provide two-way wireless voice frequency communications for wireless terminals and a packet service gateway that selectively couples the base station transceivers to the public packet data network. Also disclosed is an access manager that controls registration and validation of roaming wireless terminal devices, as well as transmission of location information for registered terminals to a home location register database via a public packet data network.

U.S. Pat. No. 6,345,294 discloses a method that allows a network appliance to boot-up remotely by obtaining configuration information from a remote source. The network appliance is able to contact a remote appliance registry to obtain information about its local environment, regardless of whether a local DHCP server or boot server exists on the local network. The appliance adheres to a principle of self-organization; it boots and observes the local environment of the LAN. The appliance broadcasts a request and waits to see whether there are responses. This method provides for a single remote configuration source that is known to the network appliance upon boot-up. It does not provide for the network appliance to obtain configuration information from a plurality of remote configuration sources.

U.S. Pat. No. 6,154,839 discloses a method for allowing a remote client to connect to a VPN through a firewall from an unknown network address. Also disclosed is a method for load balancing across multiple VPN units that couples a private network to a public network. A data packet sent from a source node to a destination node is translated and delivered on the basis of a user identifier field in the packet. The allows the data packet to be forwarded to the destination node if the user identifier is allowed communication privileges with the destination node. Thus, a list of user identifiers corresponding to all possible calling parties needs to be maintained. This method fails to provide communication privileges with the destination node in the event the user identifier is unknown, even if the network address is unknown.

U.S. Pat. No. 6,233,234 discloses a convenient and secure method of Internet telephony communication. Selectable security is provided for telephony applications through the use of an access gateway between the LAN and the packet switched data network. Information obtained from a party seeking to connect to a telephone terminal connected to the LAN is used to filter traffic on the basis of incoming or outgoing addresses or protocol. The destination terminal may only be reached first reaching the centralized access gateway, which eventually uses further information to use translation and filter tables to effect a connection to the telephone station.

The above-mentioned prior art references seek to provide IP telephony services in a secure environment by utilizing lookup tables for the purposes of: translation, identification of the user, or filtration of communications requiring additional software, processing, memory, and disk storage space. There is a need, however, for a system to provide a method to reliably establish and maintain connection with an internal host behind a firewall, regardless of the location of the host. Whatever the precise merits, features, and advantages of the above-cited references, they fail to achieve or fulfill the purposes of the present invention.

SUMMARY OF THE INVENTION

The present invention provides for a system and method for facilitating communication between IP phones (with an assigned phone number) over a packet-based communication protocol, wherein the IP phones are located behind a firewall. The present invention's IP phone comprises DHCP client software and IP agent software. The DHCP client software, upon an initial power up of the IP phone, communicates with its firewall to receive an IP address. The IP agent software, upon receiving said IP address from said firewall, registers the IP phone with a DNS switch based upon at least the following parameters: the assigned phone number, the received IP address, a public IP address associated with the firewall, or a MAC address associated with the IP phone. Upon successful registration with said DNS switch, the IP agent software receives a port number and address over which future communications are to be performed.

In one embodiment, communications between the IP agent and the DNS switch is via the Transmission Control Protocol/Internet Protocol (TCP/IP) protocol.

In another embodiment, the IP agent additionally monitors and detects changes to the public IP address associated with the corresponding firewall; upon detecting such a change, the IP agent identifies a new public IP address of said firewall and reregisters the newly identified public address with the DNS switch based upon at least the following parameters: the assigned phone number, the received IP address, the identified new public IP address associated with corresponding firewall, or the MAC address associated with said IP phone. In an extended embodiment, the IP agent monitors changes to the public IP address associated with the corresponding firewall at pre-set time intervals. In yet another embodiment, the DNS switch is behind an Internet Service Provider (ISP) gateway.

DESCRIPTION OF THE PREFERRED EMBODIMENTS

Figure 1:
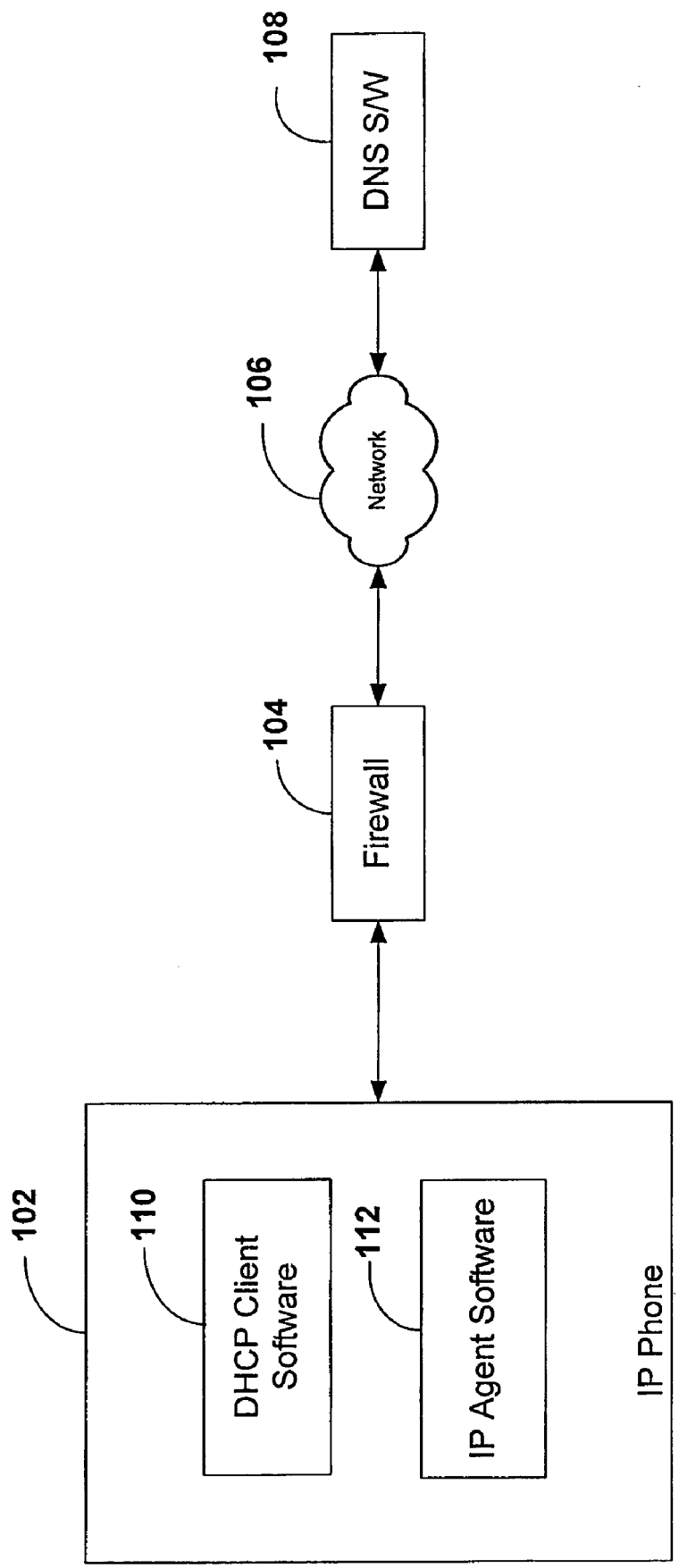
FIG. 1 illustrates an overview of the present invention system for facilitating communication between an IP phone (behind a firewall) and a dynamic DNS switch over a network.

While this invention is illustrated and described in a preferred embodiment, the invention may be produced in many different configurations. There is depicted in the drawings, and will herein be described in detail, a preferred embodiment of the invention, with the understanding that the present disclosure is to be considered an exemplification of the principles of the invention and the associated functional specifications for its construction and is not intended to limit the invention to the embodiment illustrated. Those skilled in the art will envision many other possible variations within the scope of the present invention.

FIG. 1 illustrates an overview of the present invention system for facilitating communication between an IP phone 102 behind firewall 104 and a dynamic DNS switch 108 over a network 106. The IP phone of the present invention comprises DHCP client software 110 and IP agent software 112. Network 106 is any of, but is not limited to, the following networks: a local area network (LAN), wireless networks, or the Internet.

DHCP client software 110, upon an initial power up of IP phone 102, communicates with firewall 104 to receive an IP address. Upon receiving the requested IP address from firewall 104, IP agent software 112 registers with dynamic DNS switch 108 based upon at least the following parameters: the assigned phone number of IP phone 102, said received IP address, a public IP address associated with said firewall, or a MAC address associated with said IP phone. Upon successful registration with dynamic DNS switch 108, IP agent software 112 receives a port number and address over which future communications are to be performed. Hence, all future communications addressed to IP phone 102 are routed through the received port number and address.

Figure 2:
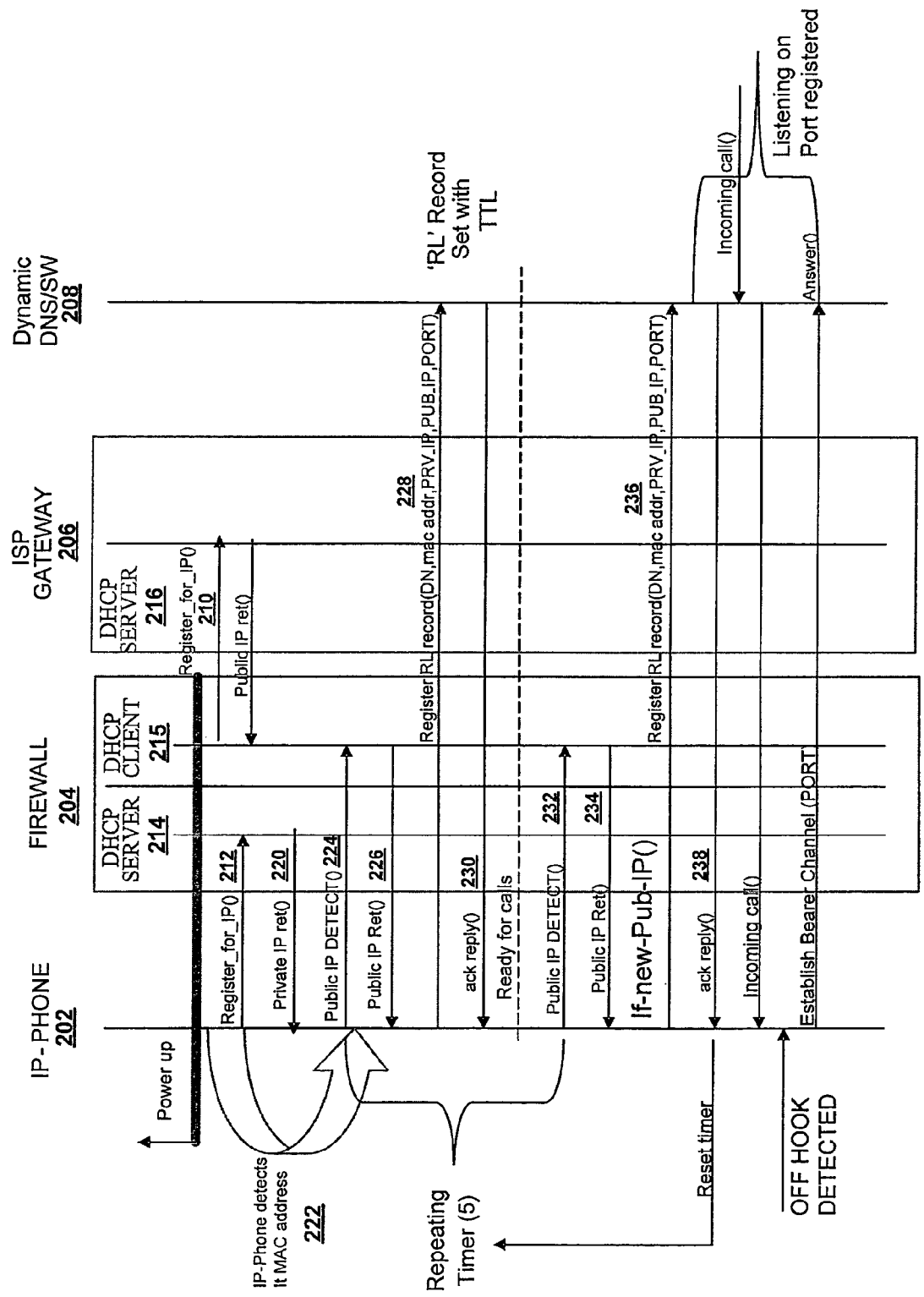
FIG. 2 illustrates a timeline diagram outlining a method associated with the preferred embodiment of the present invention.

FIG. 2 illustrates a timeline diagram outlining a method associated with the preferred embodiment of the present invention. Specifically, FIG. 2 illustrates various interactions between IP phone 202, firewall 204, ISP gateway 206, and dynamic DNS switch (DNS/SW) 208.

At power up, as shown in steps 210 and 212, IP phone 202 and firewall 204 establish connections to their respective DHCP servers (i.e., 214 and 216, respectively). In steps 218 and 220, the DHCP servers 214 and 216 issue a lease and an IP address for the respective clients (i.e., clients IP phone 202 and firewall 204's DHCP client 215). In step 222, IP phone 202 detects its media access control (MAC) address. The MAC address to ensure the correct phone is registered. Dialed Number (DN), i.e., the number assigned to the phone, is programmed in and associated with by the Dynamic DNS/SW. This association is made during provisioning of the service. IP agent residing in IP phone 202 establishes a TCP/IP connection to the Dynamic DNS/SW 208 which remains up as long as the phone is in service with keep-alive messages.

In step 224, after firewall 204 has assigned the IP address (e.g., 172.198.X.X—private address) to the IP phone 202, the IP agent residing in the IP phone 202 queries firewall 204 for its public IP address. It is envisioned that step 224 can be implemented via various ways. For example, in one embodiment, a custom browser is used to make an HTTP GET( ) query to the HTTPD service, running on almost any commercial firewalls today. It should be noted that although this is one method, there are others—including the maintenance channel using CLI interfaces on larger firewall-routers. Thus, in step 226, a public IP associated with firewall 204 is returned to the IP phone 202.

Once the IP agent has determined the public IP address, it sets a timer which is configurable (e.g., a timer in the range of 515 seconds). In step 228, the IP agent is able to register with the Dynamic DNS/SW 208 by sending a message comprising the following information:

1. DN Dialed Number
2. MAC Address
3. Private IP address
4. Public IP address
5. Port (this is the port which will be used for bearer communication on calls)

Dynamic DNS/SW 208, upon receipt of this information, validates that the number is in service and updates its DNS database with the routing information required to communicate with the phone. In step 230, Dynamic DNS/SW 208 sends back an acknowledgment message to the phone and then initiates a listen (PORT) on the port indicated in the registration message.

A TTL (time to live) timer is set in the dynamic DNS/SW 208 to indicate for how long this address is valid for, before dynamic DNS/SW 208 should re-query the hosting platform for address information. Information regarding the IP phone is stored as an "RL" (remote location) record in DNS.

As shown in steps 232-236, if a change in firewall 204's public IP is detected, the new public address for firewall 204 is detected, and such information is used to reregister the IP phone with the dynamic DNS/SW 208.

The dynamic DNS/SW 208 also stores the original home location so, if any of the following occurs, calls will revert to the home location and be processed as would be expected.

1. Signaling channel dropped or not responsive.
2. New registration attempted but old registration not dropped.

At this point, incoming calls can be properly routed to the IP phone 202. For example, in step 238, when the dynamic DNS/SW 208 receives an incoming call request, it forwards that request over the signaling channel to the IP phone 202 and waits for a CONNECT( ) to be received on the port it is listening to (i.e., the port that was identified for communication at registration time). This allows all connections to be established from behind the firewall out to the network, thus avoiding the typical NAT/NAT (network address translation) problems that occur when communication is established in the other direction. Once the CONNECT( ) is received by the dynamic DNS/SW 208, it is answered and the bearer traffic is cut through.

Figure 3:
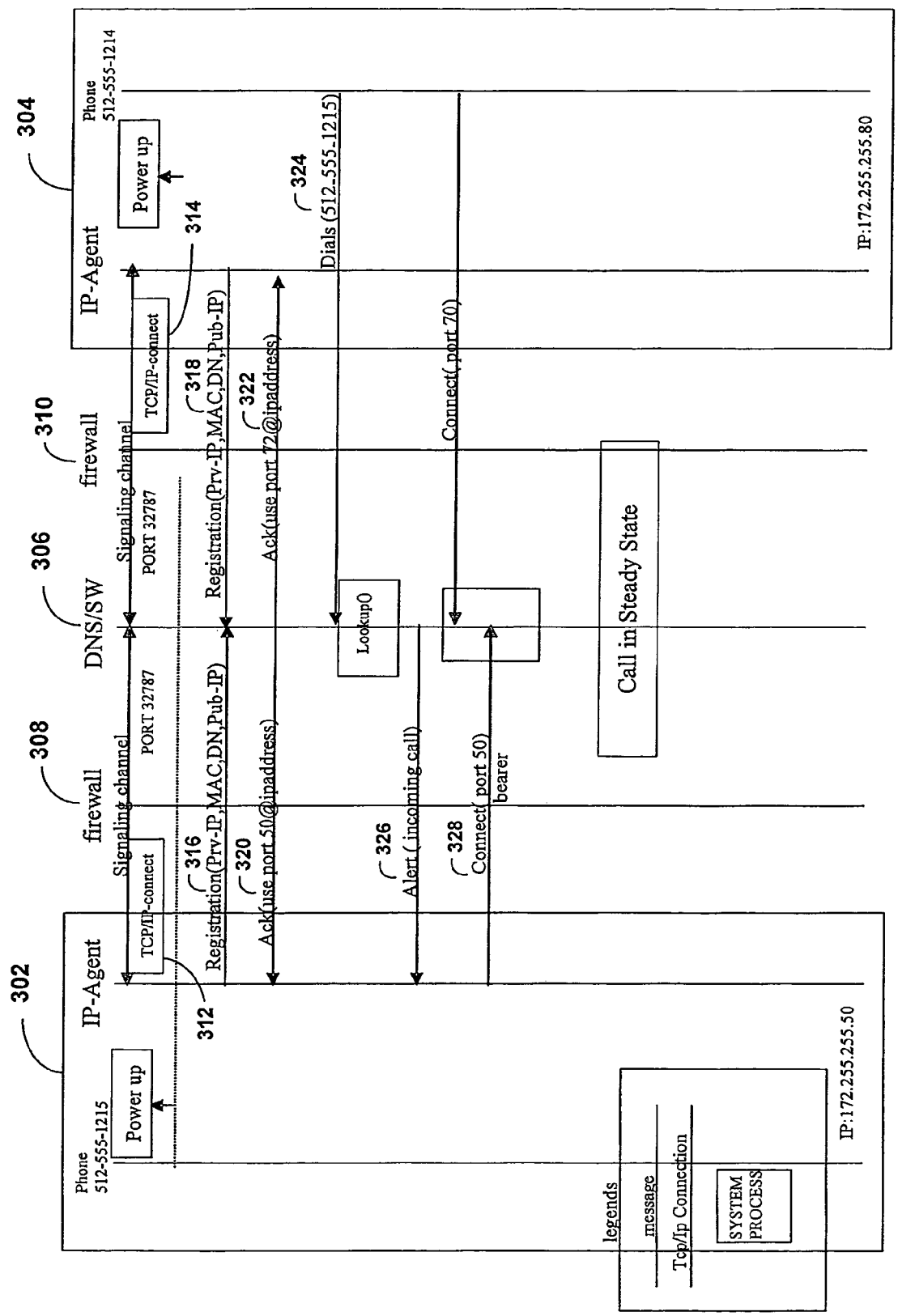
FIG. 3 illustrates a further extension to the scenario depicted in FIG. 2, wherein a timeline diagram shows the interaction between two IP phones and a dynamic switch.

FIG. 3 illustrates a further extension to the scenario depicted in FIG. 2, wherein a timeline diagram shows the interaction between two IP phones 302 and 304 and dynamic switch 306. At powerup, IP phones 302 and 304 activate the DHCP client software (not shown) to receive an IP address from their respective firewalls (i.e., 308 and 310. In steps 312 and 314, IP phones 302 and 304 activate the IP agent software, which opens a socket connection (via, for example, the TCP/IP protocol) to dynamic DNS/SW 306on a port (e.g., port 32787). The connection made via TCP/IP to the soft switch is maintained as the soft switch makes the connection between the incoming side and the out going side. In steps 316and 318, the IP agent software of each phone sends a register message to the dynamic DNS/SW 306 containing the corresponding MAC addresses, the Private IP address the Phone, the Public IP address assigned to the corresponding firewall, and its corresponding assigned phone number.

Once the registration is complete and validated (by sending acknowledgement signals in steps 320 and 322) by the dynamic DNS/SW 306, a port and address (over which future communications are to be addressed to) are sent by DNS/SW 306. This is maintained by the IP agent in phones 302 and 304

In step 324, dynamic DNS/SW 306 receives an incoming request (call) for the phone number associated with registered IP phone 302. Next, in step 326, dynamic DNS/SW 306 sends an alert message to registered IP phone 302 on the signaling channel. IP phone 302, in step 328, establishes a bearer connection from the phone back to the dynamic DNS/SW on the assigned port (e.g., port 70).

Once the connection has been received by dynamic DNS/SW 306 on the assigned port, it then connects the incoming port to the port of the called party's phone (i.e., IP phone 304). At this point, the dynamic DNS/SW monitors the communication link for disconnections. It should be noted that port connections are made using any standard protocol, including but not limited to: Session Initiated Protocol (SIP) or Media Gateway Control Protocol (MGCP).

Furthermore, the present invention includes a computer program code based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage device.

Implemented in computer program code-based products are software modules for: (a) communicating with said firewall to receive an IP address; (b) registering with a DNS switch based upon at least the following parameters: said assigned phone number, said received IP address, a public IP address associated with said firewall, or a MAC address associated with said IP phone; and (c) computer readable program code, upon successful registration with said DNS switch, receiving a port number and address over which future communications are to be performed.

CONCLUSION

A system and method has been shown in the above embodiments for the effective implementation of a method and system facilitating remote location VOIP roaming behind firewalls. While various preferred embodiments have been shown and described, it will be understood that there is no intent to limit the invention by such disclosure but, rather, it is intended to cover all modifications falling within the spirit scope of the invention as defined in the appended claims. For example, the present invention should not be limited by specific port numbers used for communication with the dynamic DNS/SW, specific duration of time to live timer, number of IP phones behind a firewall, method used to obtain public IP of a firewall, software/program, computing environment, or specific networking hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer-memory, static or dynamic, and may be retrieved by the user in any of: conventional computer storage, display (i.e., CRT) and/or hardcopy (i.e., printed) formats. The programming of the present invention may be implemented by one of skill in the art of networking.

The invention claimed is:

1. An Internet Protocol (IP) phone with an assigned phone number capable of communicating over a packet-based communication protocol, the IP phone located behind a firewall, the IP phone comprising:

a Dynamic Host Configuration Protocol (DHCP) client to, upon an initial power up of the IP phone, communicate with the firewall to receive an IP address;

an IP agent to, upon receiving the IP address from the firewall, register with a domain name system (DNS) switch based upon at least the following parameters: the assigned phone number, the received IP address, a public IP address associated with the firewall, and a medium access control (MAC) address associated with the IP phone; and wherein, upon successful registration with the DNS switch, the IP agent is to receive a port number and address over which future communications are to be performed, and the IP agent is to monitor for changes to the public IP address associated with the firewall after the IP phone is registered with the DNS switch and, upon detecting a change to the public IP address associated with the firewall, the IP agent is to identify a new public IP address associated with the firewall and reregister with the DNS switch without reinitializing the IP phone based upon at least the following parameters: the assigned phone number, the received IP address, the identified new public IP address associated with the firewall, and the MAC address associated with the IP phone.

2. An IP phone with an assigned phone number capable of communicating over a packet-based communication protocol, as per claim 1, wherein the port number accepts communication requests via any of the following protocols: Session Initiation Protocol (SIP) or Media Gateway Control Protocol (MGCP).

3. An IP phone with an assigned phone number capable of communicating over a packet-based communication protocol, as per claim 1, wherein the IP phone is additionally associated with a backup phone number, wherein communications are forwarded to the backup phone number upon any disruption in communication with the IP phone.

4. An IP phone with an assigned phone number capable of communicating over a packet-based communication protocol, as per claim 1, wherein the firewall runs a Hypertext Transfer Protocol (HTTP) service and the public IP address associated with the firewall is obtained via an HTTP GET query.

5. An IP phone with an assigned phone number capable of communicating over a packet-based communication protocol, as per claim 1, wherein the communications between said IP agent and the DNS switch is via the Transmission Control Protocol (TCP)/IP protocol.

6. An IP phone with an assigned phone number capable of communicating over a packet-based communication protocol, as per claim 1, wherein the IP agent is to monitor changes to the public IP address associated with the firewall at pre-set time intervals.

7. An IP phone with an assigned phone number capable of communicating over a packet-based communication protocol, as per claim 1, wherein the DNS switch is behind an Internet Service Provider (ISP) gateway.

8. A method for facilitating a communication link between one or more Internet Protocol (IP) phones located behind a first firewall and one or more IP phones behind a second firewall via a domain name system (DNS) switch, the method as implemented in the DNS switch comprising:
   receiving a request for a unique IP address from each of a first IP phone located behind the first firewall and a second IP phone located behind the second firewall;
   transmitting a respective unique IP address to each of the first and second IP phones;
   receiving a request for registration from each of the first and second IP phones, each of the requests based upon at least the following parameters: a unique assigned phone number, a unique IP address, a public IP address associated with a corresponding firewall, and a unique medium access control (MAC) address;
   registering the first and second IP phones based upon the received parameters associated with each IP phone, and upon successful registration, transmitting a respective port number and respective address to the first and second IP phones over which future communications are to be performed; and
   wherein the communication link is facilitated at the DNS switch between the first IP phone and second IP phone via the transmitted port numbers and addresses, the first IP phone is to monitor for changes in a public IP address associated with the first firewall after the first IP phone is registered and, upon detecting a new public IP address associated with the first firewall, the first IP phone is to reregister without reinitializing the first IP phone based upon at least the following parameters: a first assigned phone number associated with the first IP phone, a first received IP address associated with the first IP phone, the detected new public IP address associated with the first firewall, and a first MAC address associated with the first IP phone.

9. A method as per claim 8, wherein each of the numbers accepts communication requests via any of the following protocols: Session Initiation Protocol (SIP) or Media Gateway Control Protocol (MGCP).

10. A method as per claim 8, wherein each of the IP phones is associated with a backup phone number and wherein the method additionally comprises identifying a disruption in communication with either of the IP phones and forwarding communications addressed to a corresponding backup phone number.

11. A method as per claim 8, wherein each of the firewalls runs a Hypertext Transfer Protocol (HTTP) service and the public IP address associated with each firewall is obtained via a HTTP GET query.

12. A method as per claim 8, wherein changes in the public IP address associated with the first firewall are monitored at pre-set time intervals.

13. A method as per claim 8, wherein the DNS switch is behind an Internet Service Provider (ISP) gateway.

14. An article of manufacture comprising a tangible medium having computer readable code embodied therein which, when executed, facilitates communication between an Internet Protocol (IP) phone with an assigned phone number capable of communicating over a packet-based communication protocol and a domain name system (DNS) switch the IP phone located behind a firewall, wherein, when executed, the computer readable code causes a machine to:
   communicate with the firewall to receive an IP address,
   upon receiving the IP address from the firewall, register with the DNS switch based upon at least the following parameters: the assigned phone number, the received IP address, a public IP address associated with the firewall, and a MAC address associated with the IP phone,
   upon successful registration with the DNS switch, receive a port number and address over which future communications are to be performed,
   monitor for changes to the public IP address associated with the firewall after successful registration of the IP phone with the DNS switch, and
   upon detecting a new public IP address of the firewall, reregister with the DNS switch without reinitializing the IP phone based upon at least the following parameters: the assigned phone number, the received IP address, the identified new public IP address associated with the firewall, and the MAC address associated with the IP phone.

15. An article of manufacture as per claim 14, wherein the computer readable code, when executed, farther causes the machine to forward communications to a backup phone number upon identifying any disruption in communication with the IP phone.

16. An article of manufacture as per claim 14, wherein the firewall runs a Hypertext Transfer Protocol (HTTP) service and the public IP address associated with the firewall is obtained via a computer readable code generated HTTP GET query.

17. An article of manufacture as per claim 14, wherein the computer readable code, when executed, further causes the machine to monitor for changes to the public IP address associated with the firewall at pre-set time intervals.

* * * * *

UNITED STATES PATENT AND TRADEMARK OFFICE
CERTIFICATE OF CORRECTION

PATENT NO. : 7,664,096 B2  Page 1 of 1
APPLICATION NO. : 10/604072
DATED : February 16, 2010
INVENTOR(S) : Doherty et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1975 days.

Signed and Sealed this

Twenty-eighth Day of December, 2010

David J. Kappos
*Director of the United States Patent and Trademark Office*